United States Patent [19]

Bridger

[11] Patent Number: 4,548,725
[45] Date of Patent: Oct. 22, 1985

[54] REDUCING LOW TEMPERATURE HAZE FORMATION OF HYDRODEWAXED BASE STOCKS

[75] Inventor: Robert F. Bridger, Hopewell, N.J.

[73] Assignee: Mobil Oil Corporation, New York, N.Y.

[21] Appl. No.: 495,566

[22] Filed: May 18, 1983

[51] Int. Cl.$^4$ .............................................. C10L 1/28
[52] U.S. Cl. .............................. 252/56 R; 252/56 D; 208/18; 208/19
[58] Field of Search ............ 252/56 R, 56 D; 208/18, 208/19

[56] References Cited

U.S. PATENT DOCUMENTS

| 3,531,440 | 9/1970 | Mehmedbasich et al. | 252/56 R |
| 4,240,916 | 12/1980 | Rossi | 252/56 D |
| 4,438,008 | 3/1984 | Oeder et al. | 252/56 R |

Primary Examiner—Jacqueline V. Howard
Attorney, Agent, or Firm—Alexander J. McKillop; Michael G. Gilman; Van D. Harrison, Jr.

[57] ABSTRACT

A lubricant additive produced by reacting an alcohol and a maleic anhydride-olefin copolymer reduces low temperature micro-crystalline wax formation in hydrodewaxed based stock.

10 Claims, No Drawings

REDUCING LOW TEMPERATURE HAZE FORMATION OF HYDRODEWAXED BASE STOCKS

BACKGROUND OF THE INVENTION

1. Field of the Invention

This invention concerns new polymers and a method for reducing haze formation in a hydrodewaxed mineral oil base stock using same. More particularly, it relates to polymer made by reacting a polyanhydride resin with an alcohol and to a method of lowering the cloud point of the base stock by treating same the polymer.

2. Discussion of the Prior Art

Many hydrodewaxed base oils have relatively high cloud points. While other properties are excellent and the cloud point appears to have no deleterious effect on the performance of formulated oils, nevertheless there are specification tests for many oils that require that there be no overnight cloud formation in the base oil at a given temperature, often 30° F. to 40° F.

The high cloud point (or overnight cloud point, ONC) is common to many hydrodewaxed oils. Much processing work, such as selective removal of the haze components and use of crystallization inhibitors, has been done with limited success. Generally, solutions to the haze formation are uneconomic or impractical because the solutions introduce other problems such as lower viscosity index, poor storage stability, dark color, water emulsification tendency, poorer oxidation response, and the like.

No prior art is known that teaches or suggests that the herein disclosed useful results can be obtained by reacting a maleic anhydride-olefin copolymer with an alcohol and adding same to a hydrodewaxed base stock. The closest prior art known is U.S. Pat. No. 4,194,985, which teaches compounds prepared by the free radical polymerization of an ethylenically unsaturated monomer (which can be an alpha olefin) in the presence of an oil soluble dispersant (e.g., product of reaction between a carboxylic acid containing, at least 34 aliphatic carbon atoms with, inter alia, an alcohol). Table 1, which teaches typical dispersants, discloses the reaction product between, e.g., methyl or oleyl alcohol and polyisobutenylsuccinic anhydride. The polyisobutenylsuccinic compound is not polymeric, as is applicant's compounds, and the reaction carried out by patentee in the presence of the free radical initiator does not produce such polymer. If indeed any reaction at all takes place, it is merely a grafting of the unsaturated reactant to the aliphatic portion.

SUMMARY OF THE INVENTION

In accordance with the invention, there are provided polymers made up of the following recurring unit

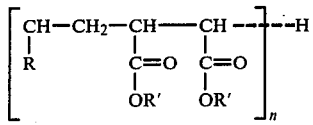

and a method of using same to reduce haze in a hydrodewaxed mineral oil base stock. In the structural unit n is 2 to 100, R is a $C_4$ to $C_{40}$, preferably a $C_6$ to $C_{24}$ alkyl group, and R' is hydrogen or a $C_4$ to $C_{40}$, preferably a $C_6$ to $C_{24}$ alkyl group, at least one of which is the latter. It will be seen that the number average molecular weight will range from (1) the molecule having R as $C_4$, both R's as hydrogen and n as 2 to (2) the molecule having R as $C_{40}$, both R's as $C_{40}$ and n as 100. In numerical terms, the range will be from about 350 to about 200,000.

DESCRIPTION OF SPECIFIC EMBODIMENTS

The method disclosed herein is generally applicable to any hydrodewaxed mineral oil susceptible to haze formation at lower temperatures. Although, as has been stated hereinabove, such haze formation does not affect other properties of the oil, specifications have been established by some companies which require oils to pass an overnight cloud point of 30° F. or higher.

The polymers are prepared by reacting a polyanhydride resin with an alcohol, and is believed to involve the following reaction

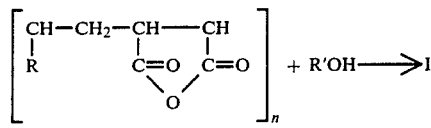

In carrying out this reaction the alcohol is used to the extent of n, 2n or from 0.5n to 2n so that the polymer will contain in the molecule from 0.5n to 2n alkoxy groups. If both carboxyls are to be esterified, it may be desirable to have an excess of the alcohol present. If an excess is desired, from about 105% to about 120% of the alcohol, based on the amount required to supply 2n alkoxy groups, can be present. Higher amounts could be used, but would not give better yields and would not be economical.

The reaction is run at from about 170° C. to about 250° C. and will normally require from about 1 to 8 hours depending upon the alcohol used.

The polyanhydride may be prepared from a mixture of approximately equimolar amounts of olefin and maleic anhydride in the presence of a free radical initiator in accordance with the reaction

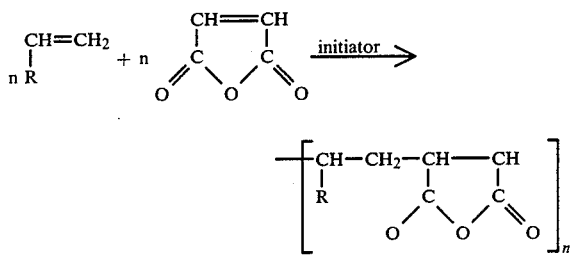

The ratio of olefin to maleic anhydride could vary from 0.8 to 1.2. Suitable free radical initiators include tertiary-butyl peroxide, benzoyl peroxide, tertiary-butyl perbenzoate, 2,2'-azobis (2-methylpropionitile), and the like. While reaction time and temperature will depend on the half-life of the initiator, reaction times will generally be between 2 to 24 hours (preferably 4 to 8) and temperatures between 40° C. and 150° C. (preferably 60° C. to 130° C.). No solvent is required and an oxygen-free atmosphere is desirable. Pressure may be used if the olefin is volatile at reaction temperature.

The haze component is present in the oil in very small amounts, often less than about 0.1% by weight of the oil. To solubilize this component a haze reducing amount of polymer is added to the oil. This will normally be from about 0.1% to about 2%, preferably from about 0.25% to about 1.5% by weight of the oil.

One specific hydrodewaxed mineral oil base stock in which haze formation is a problem is Adelaide MLDW bright stock, having the following properties:

| TEST | VALUE |
|---|---|
| Gravity | 26 |
| Pour Point, °F. | 20 |
| Flash Point, °F. | 565 |
| Viscosity @ 100° F., SUS | 2570 |
| Viscosity @ 210° F., SUS | 153 |
| Viscosity Index | 96 |
| Mars Spec: | |
| 15% paraffins | |
| 14% mononaphthenes | |
| 25% polynaphthenes | |
| 48% aromatics | |

This oil, without the polymer of the invention, produces a visible haze on storage overnight at 0° F. The haze disappears as the temperature rises, but it will reform on cooling again.

Having described the invention in general terms, the following Example is offered as a specific embodiment. It will be understood that it is illustrative of the invention and is not intended to limit its scope.

EXAMPLE

The polyanhydride resin used was a copolymer of 1-octadecene and maleic anhydride having a monomer unit molecular weight of about 350, was a commercial material obtained from Gulf Oil Chemical Company (Tradename PA-18 Polyanhydride Resin). 20 grams of this polyanhydride resin (0.057 equivalent) and 30.8 grams of stearyl alcohol (0.114 mol) were heated to 200° C. in a stream of nitrogen. After the mixture reached 200° C., it was stirred 4 hours at that temperature under a stream of nitrogen, to give 48.8 g. of a product containing two alkoxy groups per structural unit in the polymer.

EVALUATION OF THE COMPOUND(S)

Effectiveness of the additive was determined by comparing various concentrations with a set of standards made by preparing blends of 10, 20, 30, 40, 50, 60, 70, 80, and 90% of decolorized solvent dewaxed (SDW) oil in hydrodewaxed (HDW) oil. Both references and samples were stored at 0° F. overnight (16 hours total) and were evaluated by visually matching the experimental sample with the reference which it most closely resembled. A sample matching the 80% SDW-20% HDW reference is said to display an 80% improvement, etc. The sample of the Example gave the following results:

| Wt. of Additive In MLDW Stock | Percent Improvement | | |
|---|---|---|---|
| | Rating No. 1 | Rating No. 2 | Rating No. 3 |
| 0.5 | 70 | 40 | 80 |
| 1.0 | 90 | 80 | 90 |

*Ratings 1, 2 and 3 were given by three different workers

Types of oils which benefit most are oils which have been dewaxed by any type of hydroprocessing, or in which wax has been removed by cracking or hydrocracking the wax, as opposed to conventional solvent dewaxing.

I claim:

1. A method for lowering the cloud point of a hydrodewaxed mineral oil base stock which comprises adding to said base stock a cloud point lowering amount of a polymer having the formula

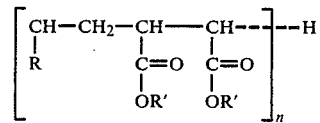

wherein R is a $C_4$ to $C_{40}$ alkyl group, R' is hydrogen or a $C_4$ to $C_{40}$ alkyl group and n is 2 to 100.

2. The method of claim 1 wherein said amount is from about 0.1% to about 2% by weight of the oil.

3. The method of claim 1 wherein said amount is from about 0.25% to about 1.5% by weight of the oil.

4. The method of claim 1 wherein R is a $C_6$ to $C_{24}$ alkyl group.

5. The method of claim 1 wherein R is a hydrogen or a $C_4$ to $C_{24}$ alkyl group.

6. The method of claim 1 wherein R is 1-hexadecyl and R' is stearyl.

7. A lubricant composition comprising a major proportion of a hydrodewaxed lubricating oil and a cloud point lowering amount of a polymer having the formula

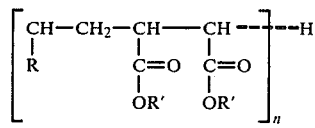

wherein R is a $C_4$ to $C_{40}$ alkyl group, R' is hydrogen or a $C_4$ to $C_{40}$ alkyl group and n is 2 to 100.

8. The composition of claim 7 wherein R is a $C_6$ to $C_{24}$ alkyl group.

9. The composition of claim 8 wherein R' is hydrogen or a $C_6$ to $C_{24}$ alkyl group.

10. The composition of claim 7 wherein R is 1-hexadecyl and R' is stearyl.

* * * * *